US008368707B2

(12) United States Patent
Lao et al.

(10) Patent No.: US 8,368,707 B2
(45) Date of Patent: Feb. 5, 2013

(54) MEMORY MANAGEMENT BASED ON AUTOMATIC FULL-SCREEN DETECTION

(75) Inventors: Changan Lao, San Jose, CA (US); Kenneth C. Dyke, Sunnyvale, CA (US); John Stauffer, Gilroy, CA (US)

(73) Assignee: Apple Inc., Cupertino, CA (US)

( * ) Notice: Subject to any disclaimer, the term of this patent is extended or adjusted under 35 U.S.C. 154(b) by 852 days.

(21) Appl. No.: 12/467,953

(22) Filed: May 18, 2009

(65) Prior Publication Data

US 2010/0289806 A1 Nov. 18, 2010

(51) Int. Cl.
*G06F 13/00* (2006.01)
*G09G 5/399* (2006.01)
*G09G 5/36* (2006.01)

(52) U.S. Cl. ......... 345/536; 345/538; 345/539; 345/547

(58) Field of Classification Search .................. 345/536, 345/538, 539, 547
See application file for complete search history.

(56) References Cited

U.S. PATENT DOCUMENTS 4,853,795 A * 8/1989 Morton et al. ................ 358/447
4,855,936 A 8/1989 Casey et al.
5,343,557 A 8/1994 Kiel et al.
5,357,267 A 10/1994 Inoue
5,502,808 A * 3/1996 Goddard et al. .............. 345/537
5,606,707 A * 2/1997 Tomassi et al. ............... 345/418
5,692,140 A * 11/1997 Schmitt et al. ................ 715/856
5,808,629 A 9/1998 Nally et al.
5,945,965 A * 8/1999 Inoguchi et al. .................. 345/6
6,078,942 A * 6/2000 Eisler et al. ................... 718/100
6,128,026 A 10/2000 Brothers, III et al.
6,348,919 B1 * 2/2002 Murphy ........................ 345/421
6,411,302 B1 * 6/2002 Chiraz .......................... 345/545
6,731,756 B1 * 5/2004 Pizano et al. ................. 380/201
7,489,318 B1 * 2/2009 Wilt ............................. 345/582
2002/0135585 A1 * 9/2002 Dye et al. ...................... 345/531
2002/0165922 A1 * 11/2002 Wei .............................. 709/205
2003/0140179 A1 * 7/2003 Wilt et al. ..................... 709/321
2003/0179208 A1 * 9/2003 Lavelle ......................... 345/539
2004/0130568 A1 * 7/2004 Nagano et al. ................ 345/733
2005/0062760 A1 * 3/2005 Twede .......................... 345/619
2005/0168471 A1 * 8/2005 Paquette ....................... 345/536
2007/0024645 A1 * 2/2007 Purcell et al. ................ 345/634
2007/0070074 A1 3/2007 Jiang
2007/0296718 A1 * 12/2007 Tzruya et al. ................ 345/418
(Continued)

OTHER PUBLICATIONS

"Reading swap chain back buffer ", (forum post) http://forums.xna.com/forums/p/15639/83023.aspx, (Aug. 11, 2008), 2 pages.

*Primary Examiner* — David T Welch
(74) *Attorney, Agent, or Firm* — Blakely, Sokoloff, Taylor & Zafman LLP

(57) ABSTRACT

A window surface associated with a first application is automatically detected as an exclusive window surface for a display. In response, the system automatically transitions to a full-screen mode in which a graphics processor flushes content to the display. The full-screen mode includes flipping between a front surface buffer and a back surface buffer associated with the first application. It is subsequently detected that the window surface associated with the first application is not an exclusive window surface for the display. In response, the system automatically transitions to a windowed mode in which the graphics processor flushes content to the display. In windowed mode, the system frame buffer is flushed to the display. The transition to windowed mode includes a minimum number of buffer content copy operations between the front surface buffer, the back surface buffer and the system frame buffer.

16 Claims, 6 Drawing Sheets

U.S. PATENT DOCUMENTS

| | | | | |
|---|---|---|---|---|
| 2008/0066006 | A1 * | 3/2008 | Kim | 715/781 |
| 2008/0122852 | A1 * | 5/2008 | Noyle et al. | 345/520 |
| 2008/0229232 | A1 * | 9/2008 | Schulz et al. | 715/781 |
| 2009/0310933 | A1 * | 12/2009 | Lee | 386/68 |

* cited by examiner

MEMORY MANAGEMENT BASED ON AUTOMATIC FULL-SCREEN DETECTION

FIELD

Embodiments relate to memory management, and more particularly to managing video memory and rendering video content in full-screen or windowed modes.

BACKGROUND

Content on a computer is frequently displayed on a display screen in one of two modes. One of the modes is called Full-Screen Mode, while the other mode is frequently referred to as Windowed Mode. Full-Screen Mode is used for applications that are the exclusive content provider for a display screen. In other words, when a single application displays content that occupies the full screen and there are no other applications that are displaying content on top of that screen, then that application might run in Full-Screen Mode. Windowed Mode is used when multiple applications, or processes, occupy or share the display screen concurrently. For example, a web browser application might be displayed such that it covers an entire display screen while a pop-up window having volume controls, or some other kind of accessory, might be displayed on top of that browser window. Another example might be a calendar reminder (e.g., issued by a calendaring program) that pops up in front of a word processing application that was previously occupying the full screen. In these situations, when multiple processes or applications are sharing the display screen, Windowed Mode is used to composite the content onto the display screen.

Both the Windowed Mode and Full-Screen Mode have various advantages and disadvantages. The advantage of Windowed Mode, obviously, is that content from multiple applications, or processes, can be composited onto a display screen at the same time. Full-Screen Mode, on the other hand, can have the advantage, for example, of reducing the need for buffer space in video memory and can allow certain types of content (e.g., video content) to display more efficiently and with less jitter, delay and/or other errors.

In a very generic way, the ability to manually switch between Windowed Mode and Full-Screen Mode is known in the art. However, there are challenges involved in automatically switching between the Windowed Mode and the Full-Screen Mode. Traditional systems may not automatically detect conditions that allow the system to switch between a Full-Screen Mode and Windowed Mode. Further complexity is added when a system for displaying video content is “double buffered.” Double buffering involves the use of multiple buffers to prepare video content, or other display content from an application, for rendering to a display screen.

SUMMARY OF THE DESCRIPTION

A system for switching between Windowed Mode and Full-Screen Mode in a display is described herein. A window surface associated with the first application is detected automatically as being an exclusive window surface for a display screen. In response to detecting the exclusive window surface, the system automatically transitions to a Full-Screen Mode in which a graphics processor flushes content to a display screen. Included in this Full-Screen Mode is the ability to flip between a front-surface buffer and a back-surface buffer associated with the application. The system also automatically detects when a window surface associated with an application is not the exclusive window surface for the display. When the window surface is detected as being non-exclusive, the system automatically transitions to a Windowed Mode, in which the graphics processor flushes content to the display by flushing the system-frame buffer. The transition from a Full-Screen Mode to Windowed Mode includes a minimum number of buffer content copy operations between the front-surface buffer, the back-surface buffer of the application, and the system-frame buffer.

BRIEF DESCRIPTION OF DRAWINGS

The following description includes discussion of figures having illustrations given by way of example of implementations of embodiments of the invention. The drawings should be understood by way of example, not by way of limitation. As used herein, references to one or more “embodiments” are to be understood as describing a particular feature, structure, or characteristic included in at least one implementation of the invention. Thus, phrases such as “in one embodiment” or “in an alternate embodiment” appearing herein describe various embodiments and implementations of the invention, and do not necessarily all refer to the same embodiment. However, they are also not necessarily mutually exclusive.

DETAILED DESCRIPTION

Embodiments described herein facilitate switching between Full-Screen Mode and Windowed Mode in a display system. Not only is the switching performed automatically, but also the switching is accomplished by using a minimum number of buffer content copy operations. This is significant, given that various embodiments described herein relate to application and processes that employ double buffering in video memory when rendering display content to a display screen.

Figure 1:
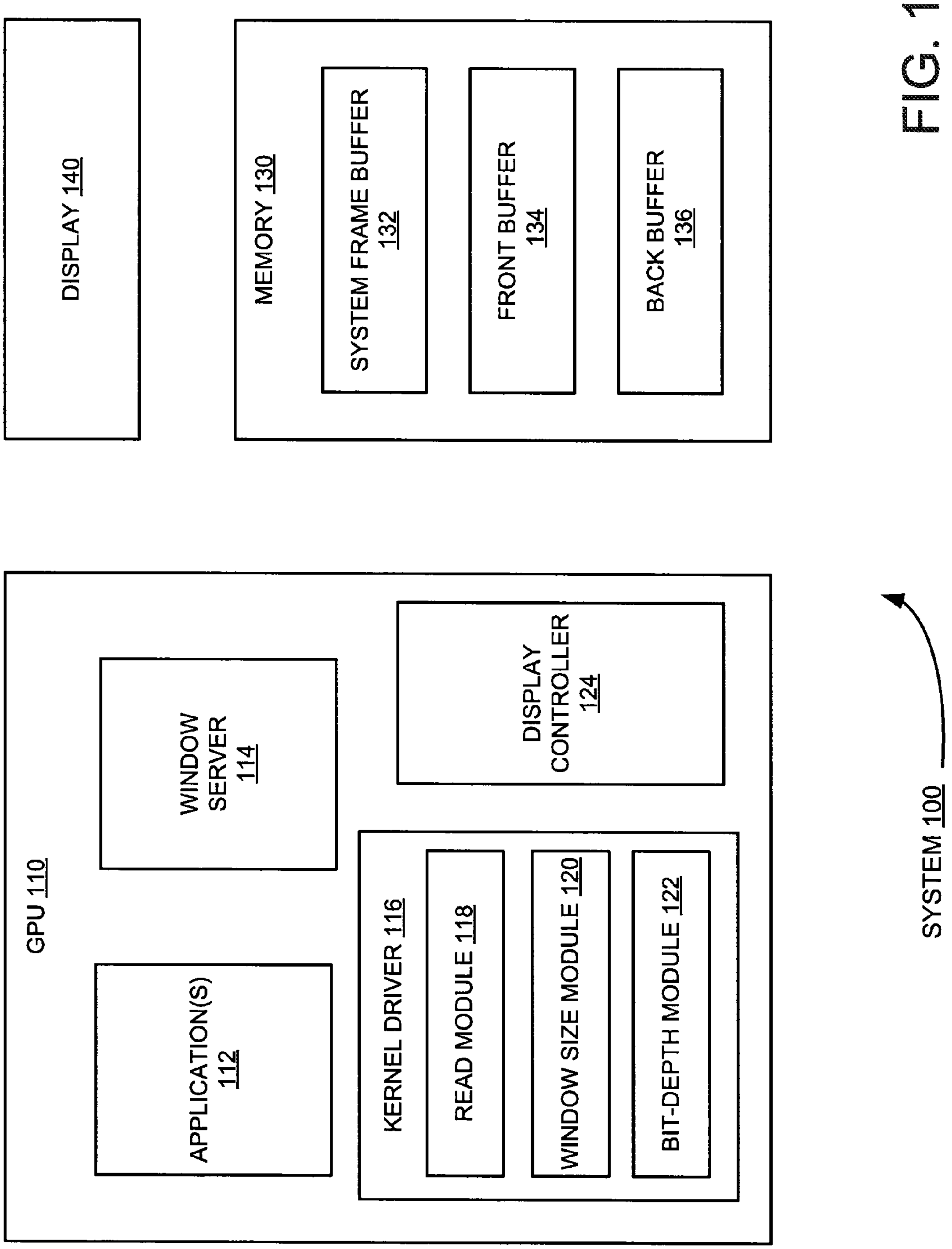
FIG. 1 is a block diagram illustrating a system according to various embodiments.

FIG. 1 is a block diagram according to various embodiments. System 100 includes a graphics processor 110, a memory 130, and a display 140. More components or fewer components could be used in other embodiments. For example, various embodiments might include input/output devices, additional memory units, and/or other computing modules. As shown, graphics processor 110 includes one or more applications 112, a window server 114, a kernel driver 116, and a display controller 124. Applications 112 can be the source of various types of content, including dynamic or animated content, static content, etc.

Application 112 sends display content to kernel driver 116 for rendering to display 140. Application 112 may send content in the form of drawing commands, or the content may be sent as a completed window surface. As used herein, a “window surface” refers to the data necessary to render content from an application or process for display on the display screen 140. In various embodiments, a window surface may represent, for example, a single frame (e.g., a video frame) or a sequence of frames (e.g., a video clip, segment, movie, etc.) to be displayed on a displayed screen.

While window server 114 serves to render content to display 140, kernel driver 116 is notified by window server 114 of a window surface's visible rectangle changes. In other words, kernel driver 116 can detect various conditions and parameters associated with window server 114 to facilitate rendering content in Full-Screen Mode or Windowed Mode. In various embodiments, window surfaces are logically organized as rectangles, though it will be understand that other logical organizations of window surfaces could be employed. If a particular window surface is composed of a single visible rectangle, then it is possible that that single visible rectangle corresponds to a full screen rectangle on display 140. However, it is possible that a single visible rectangle only covers, for example, half of the display screen. To qualify for Full-Screen Mode, a single visible rectangle must encompass the entire screen, meaning that the size of the visible rectangle must be equal to the full size of the display screen. System-frame buffer 132 holds display content before it is flushed to display 140. Thus, if a window surface fills the entire system-frame buffer 132, it can be ascertained that the window surface covers the full screen of display 140. In other embodiments, different buffers (e.g., front buffer 134, back buffer 136, etc.) can be used to determine whether a window surface covers the full screen of a display. Though it is likely in various embodiments that the buffers described herein are of equal size, they are not necessarily equal in size.

In various embodiments, kernel driver 116 extracts visible rectangle information and window size information from window server 114 based on notifications from window server 114 and/or memory 130. Rectangle module 118 detects a number of visible rectangles in a window surface and determines whether the number of visible rectangles in the window surface is greater than one. Window server 114 logically organizes the window surface into visible rectangles, which information is made available to rectangle module 118. Widow-size module 120 detects the size of the window surface (e.g., based on buffer usage) and determines whether the size of the window surface is less than, or equal to, the size of the system-frame buffer. If, for a given window surface, the surface is composed of only one visible rectangle and the rectangle fills the entire system-frame buffer, the kernel driver 116 determines that the window surface is the exclusive window surface for the display 140. In other words, the kernel driver 116 knows that no other application is currently attempting to render content to display 140. If a window surface is the exclusive window surface being displayed by display screen 140, then Full-Screen Mode may be used as long as the bit depth of the window surface is equal to the bit depth of the display. For example, display 140 might be a 32-bit display, while the application currently rendering content to the display 140 might be a 16-bit application. In that scenario, the bit depths of the application and the display are not equal, meaning that some modification needs to be made to the window surface before rendering it to display 140. Such a window surface modification must be handled by window server 114 in Windowed Mode before rendering to display 140.

For this reason, bit-depth module 122 determines whether the bit depth of the application is equal to the bit depth of the display. Thus, if a window surface is the exclusive window surface for display and the bit depth of the window surface is equal to the bit depth of the display, then the window surface and the content associated with application 112 can be rendered in Full-Screen Mode.

If window server 114 detects that part of a window surface is clipped out, or, in other words, there are multiple visible rectangles defining the window surface, then window server 114 makes this information available to kernel driver 116 via rectangle module 118. Again, multiple visible rectangles signify that the current window surface is not the exclusive content provider for display 140. Window server 114 may also generate info that the window size for the window surface is less than the full size of system-frame buffer 132. In either case, kernel driver 116 determines that Full-Screen Mode can no longer be maintained and that switching to Windowed Mode is necessary.

In various embodiments, when application 112 sends drawing commands to create a window surface, that window surface is created in one of two buffers for the application. As shown in FIG. 1, each application is allocated space in memory 130, i.e., a front buffer 134 and a back buffer 136. Accordingly, memory 130 may include multiple front buffers and multiple back buffers for various applications. The double-buffering is useful because an application can draw window surface into its back buffer 136 while the contents of the front buffer 134 are either flushed to system-frame buffer 132, or flushed directly to display 140. As described herein, "flushing" may include performing a block image transfer operation, also referred to as "blitting."

In Windowed Mode, buffer content for an application (either in the front buffer, or the back buffer) must be moved to system-frame buffer 132 before being flushed to display 140. This buffer-content copy operation has some cost associated with it. In contrast, in Full-Screen Mode, buffer content for an application is flushed directly to display 140 (e.g., from either the front or back buffer) without having to be copied to system-frame buffer 132. In switching from Windowed Mode to Full-Screen Mode, display controller 124 can simply move a display content source pointer from system-frame buffer 132 to one of the two application buffers, 134 or 136. However, when switching from Full-Screen Mode back to Windowed Mode, the buffer contents must be reorganized so that data, and/or frames, are not lost.

Figure 2A:
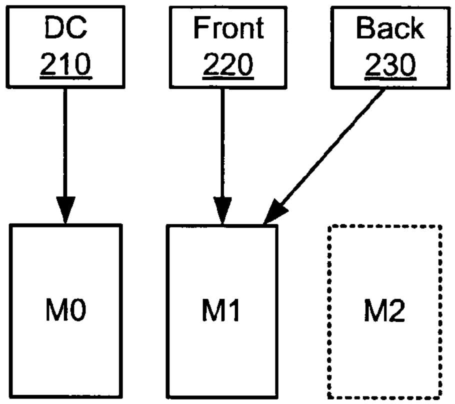
FIGS. 2A-2D illustrate various configurations for displaying content in Windowed Mode.
Figure 2B:
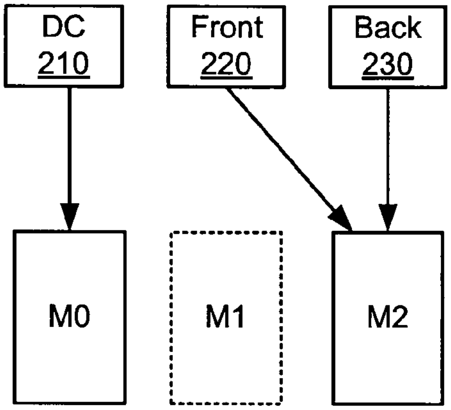
Figure 2C:
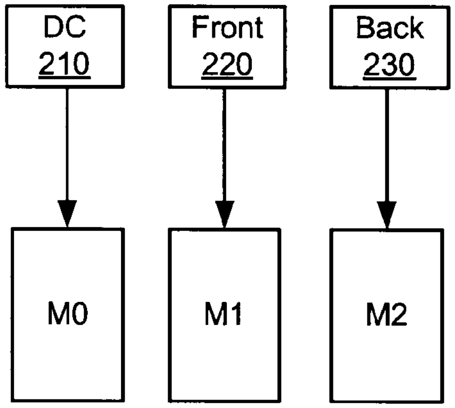
Figure 2D:
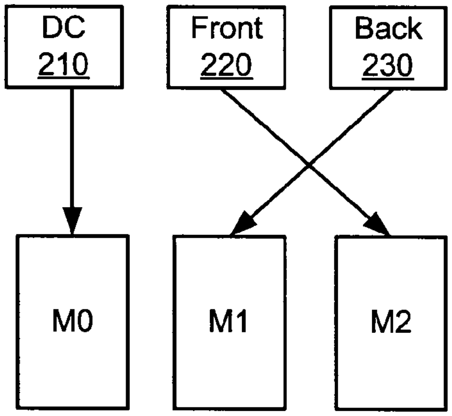

FIGS. 2A through 2D illustrate various configurations for displaying content in Windowed Mode. For example, FIGS. 2A and 2B illustrate a single-buffered configuration in a double-buffered system operating in Windowed Mode. Display controller (DC) 210 points to memory M0, which represents a system-frame buffer. In other words, when rendering content to display 140, DC 210 retrieves the content stored in the system-frame buffer (M0) and provides it to the display. In embodiments using an analog display screen, retrieved display content is converted from digital to analog. FIGS. 2C and 2D illustrate the two double-buffered configurations. DC 210 always points to the system frame-buffer (M0). After an application draws a window surface in one of the application buffers (e.g., M1), it draws the next window surface in the other application buffer (e.g., M2). While the next window surface is being drawn, the previously drawn surface (e.g., the surface in M1) is copied to the system frame-buffer (M0). (In various embodiments, Windowed Mode allows multiple applications to copy buffer content to the system frame-buffer concurrently for compositing by the window server.) The application thus switches back and forth between the two buffer locations (i.e., M1 and M2) to draw content while the content in the other buffer is copied to the system frame-buffer (M0).

FIGS. 3A-3D illustrate various configurations for displaying content in Full-Screen Mode. By pointing the front buffer 220 to the same memory location as display controller 210, the need to perform buffer content copy operations for each rendered window surface is eliminated. This is because content is flushed to screen based on the display controller (DC) pointer. When flipping between front buffer 220 and back buffer 230, the DC 210 pointer is simply moved back and forth between respective memory locations (e.g., between M0 and M2 in FIG. 3B). In some embodiments, the initial transition to Full-Screen Mode may require a single buffer content copy operation to copy the front buffer content to the system frame-buffer (if the pointer for front buffer 220 is moved to point to the same location as DC 210). In other embodiments, the display controller may simply move its pointer to establish the existing front buffer memory location as the source for flushing content to screen.

Table 1, below, illustrates the various Windowed Mode to Full-Screen Mode memory configuration transitions:

TABLE 1

Figure 3A:
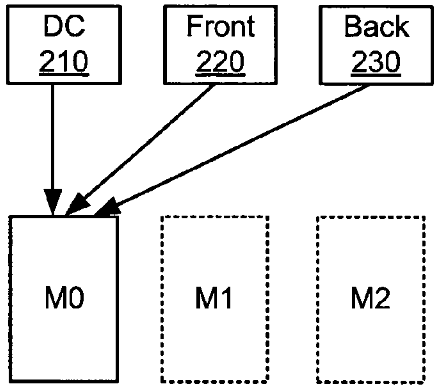
FIGS. 3A-3E illustrate various configurations for displaying content in Full-Screen Mode.
Figure 3B:
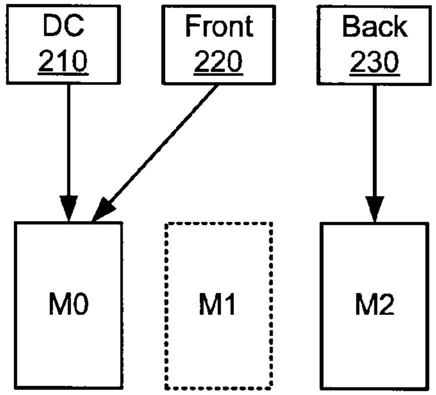
Figure 3C:
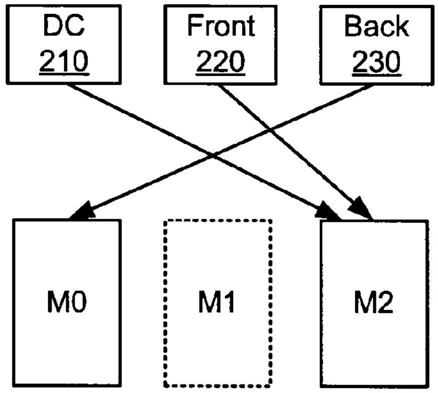
Figure 3D:
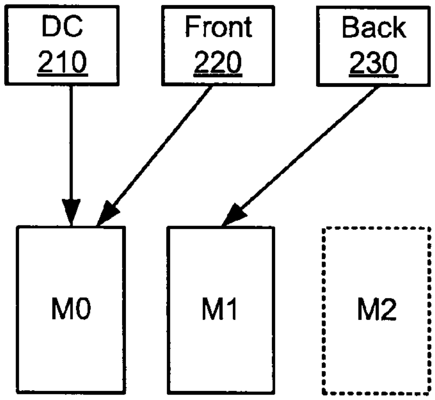

| Windowed Mode to Full-Screen Mode Transitions |
|---|
| FIG. 2A → FIG. 3A |
| FIG. 2B → FIG. 3B |
| FIG. 2C → FIG. 3B |
| FIG. 2D → FIG. 3D |

One example of a transition from Windowed Mode to Full-Screen Mode is as follows. As shown in FIG. 2C, DC 210, front buffer 220, and back buffer 230 each point to a different location in memory in Windowed Mode. When switching to Full-Screen Mode, shown in FIG. 3B, front buffer 220 simply moves its pointer to point to M0, which is the same space that DC 210 points to. Thus, once in Full-Screen Mode, the application's front buffer 220 effectively serves as the system-frame buffer and content can be flushed directly from front buffer 220 to the display screen. Meanwhile, the application's back buffer can be used to draw a window surface in to memory M2 and DC 210 can then flip back and forth between M0 and M2 to render content without having to copy content from one buffer in to another buffer.

Transitioning from one of the Full-Screen Mode states, as shown in FIGS. 3A through 3E, to one of the Windowed-Mode states, shown in FIGS. 2A through 2D, requires more complexity in various embodiments. The transition from Full-Screen Mode to Windowed Mode requires at least one buffer content copy operation. However, as illustrated in Table 2 below, various embodiments facilitate a minimum number of buffer content copy operations to transition from Full-Screen Mode to Windowed Mode:

TABLE 2

Figure 3E:
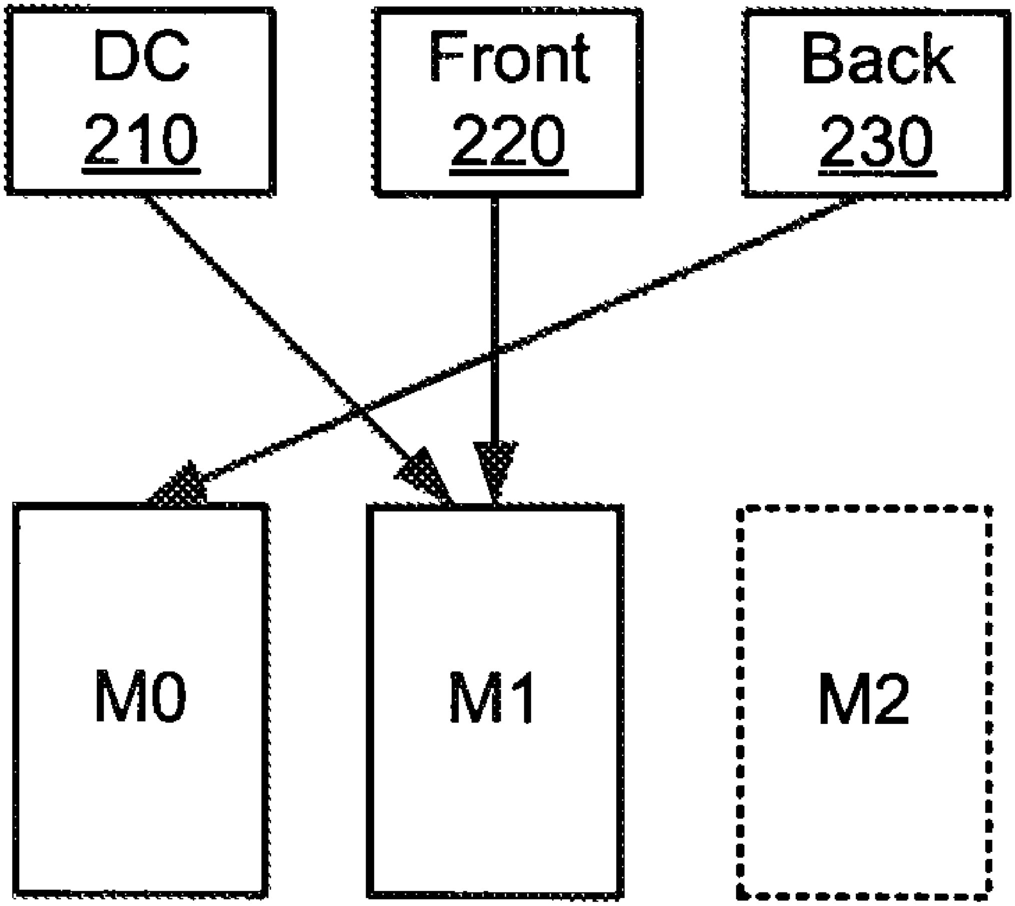

| Full-Screen Mode to Windowed Mode Transitions | |
|---|---|
| FIG. 3A → FIG. 2A | Copy M0 to M1 |
| FIG. 3B → FIG. 2C | Copy M0 to M1 |
| FIG. 3C → FIG. 2D | Copy M0 to M1, Copy M2 to M0 |
| FIG. 3D → FIG. 2D | Copy M0 to M2 |
| FIG. 3E → FIG. 2C | Copy M0 to M2, Copy M1 to M0 |

One example of a transition from Full-Screen Mode to Windowed mode is explained as follows. As shown in FIG. 3C, DC 210 and front buffer 220 point to memory M2 while back buffer 230 points to M0. Per Table 2, the transition to Windowed Mode includes transitioning to the configuration illustrated in FIG. 2D. When making this transition, DC 210 changes its pointer from M2 to M0 while back buffer 230 changes its pointer from M0 to M1. To prevent data loss, the contents of M2 must be copied to M0 corresponding to the moving of the DC 210 pointer. However, the data currently in M0 must be preserved for back buffer 230. Thus, the contents of M0 must be copied to M1 before the operation that copies M2 to M0. In this way, all content is preserved and the memory configuration is restored to operate in Windowed Mode.

Figure 4:
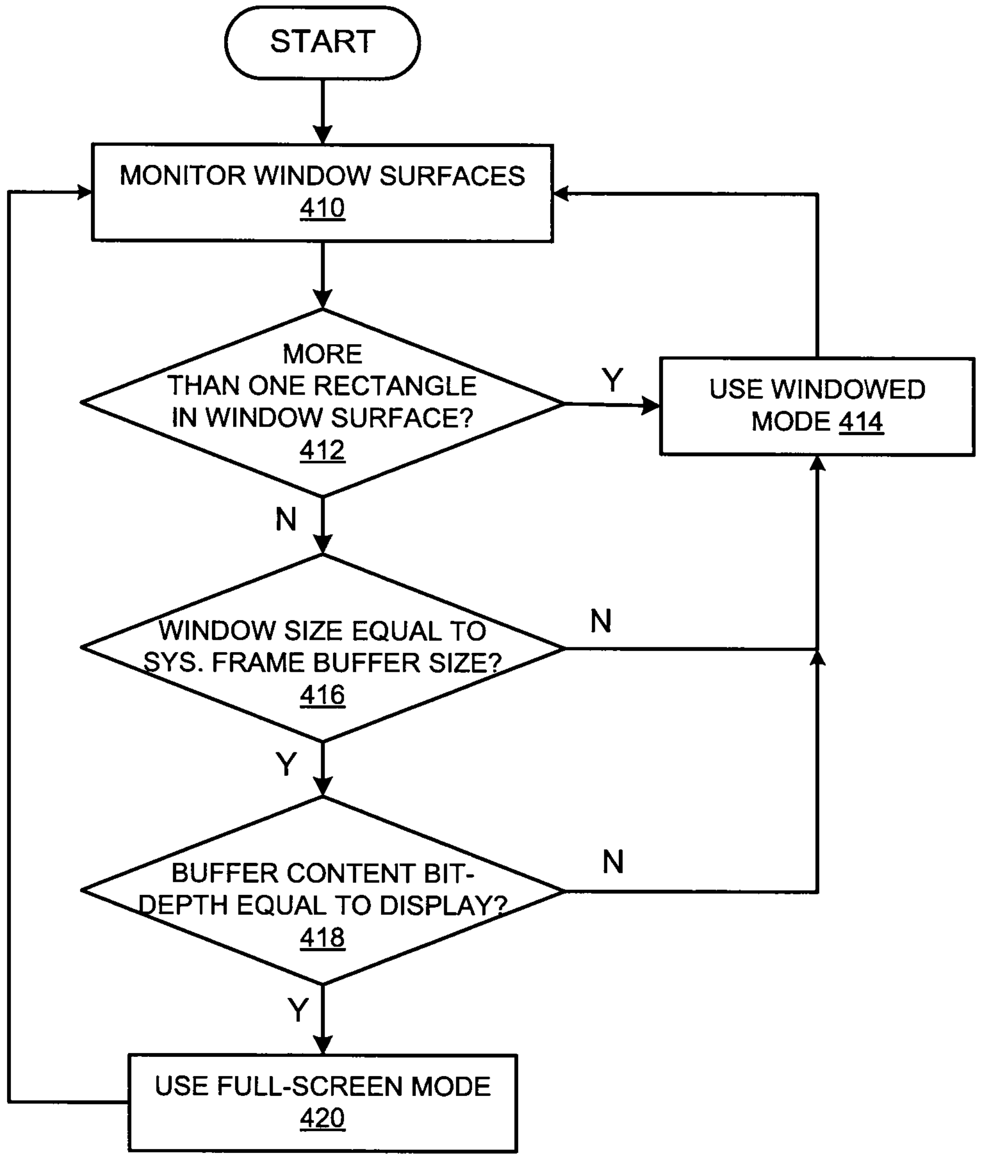
FIG. 4 is a flow diagram of operation in a system according to various embodiments.

FIG. 4 illustrates a flow diagram according to various embodiments. It should be noted that the ordering of steps in the flow diagram can be changed in various embodiments. More steps or fewer steps could be employed to automatically move between Windowed Mode and Full-Screen Mode.

Window surfaces associated with one or more graphics-related applications are monitored 410. In various embodiments, the monitoring is performed by a kernel driver in a graphics processor. However, other elements could be implemented to monitor window surfaces. As part of the monitoring process, it is determined 412 whether the window surface comprises more than one visible rectangle. As discussed above, a kernel driver may have visibility in various embodiments into the window server or may receive notifications from a window server. The window server makes various calculations for a window surface to composite the window surface, if necessary, with other window surfaces to be displayed concurrently on the display. The kernel driver, based on information from the window server, may have access to such calculations (e.g., number of visible rectangles in the window surface, size of window surface, etc.).

If it is determined there is more than one visible rectangle, then the current window surface is not the exclusive content provider for the display screen. In other words, multiple surfaces must be composited. Thus, Windowed Mode is used 414. Accordingly, if more than one visible rectangle is detected and the system is already in Windowed Mode, that mode will be maintained. In contrast, if more than one visible rectangle is detected and the system is currently in Full-Screen Mode, then the system transitions from Full-Screen Mode to Windowed Mode. In various embodiments, the transition from Windowed Mode to Full-Screen is performed based on the transitions described in Table 2 above. As described, the transitions of Table 2 minimize the number of buffer content copy operations to improve system efficiency.

If, during the monitoring, it is determined that there is only one visible rectangle for the window surface, it is then determined 416 whether the size of the window surface is equal to the size of the system-frame buffer. In some embodiments, the size of the window surface could be compared against the size of a different buffer or it could be compared against a threshold value. If the size is not equal to the system-frame buffer (or does not equal a threshold value, etc.), then the window surface is not an exclusive content provider for the display screen. In such a case Windowed Mode is, again, used 414 (either by maintaining Windowed Mode or transitioning to Windowed Mode).

If, however, the window size is equal to the system-frame buffer size (or equal to a threshold value, etc.), then it is determined whether the bit depth (e.g., 16 bit vs. 32 bit) of the window surface is equal to the bit depth of the display 418. (While bit depth is discussed herein as a factor in determining whether Full-Screen Mode can be used, other known compatibility factors can be considered instead of or in addition to bit-depth.) If the bit depth of the application buffer content is not equal to the bit depth of the display, then it is necessary to use Windowed Mode 414. But, if the bit depth of the buffer content is equal to the bit depth of the display, then Full-Screen Mode may be used 420.

Again, if the system is currently in Windowed Mode at the time it is determined to use Full-Screen Mode, then a transition to Full-Screen Mode is made. If the system is already in Full-Screen Mode, then Full-Screen Mode is maintained. In either case, the system continues to monitor the window surfaces being presented for display to determine whether to use Windowed Mode, or Full-Screen Mode.

Figure 5:
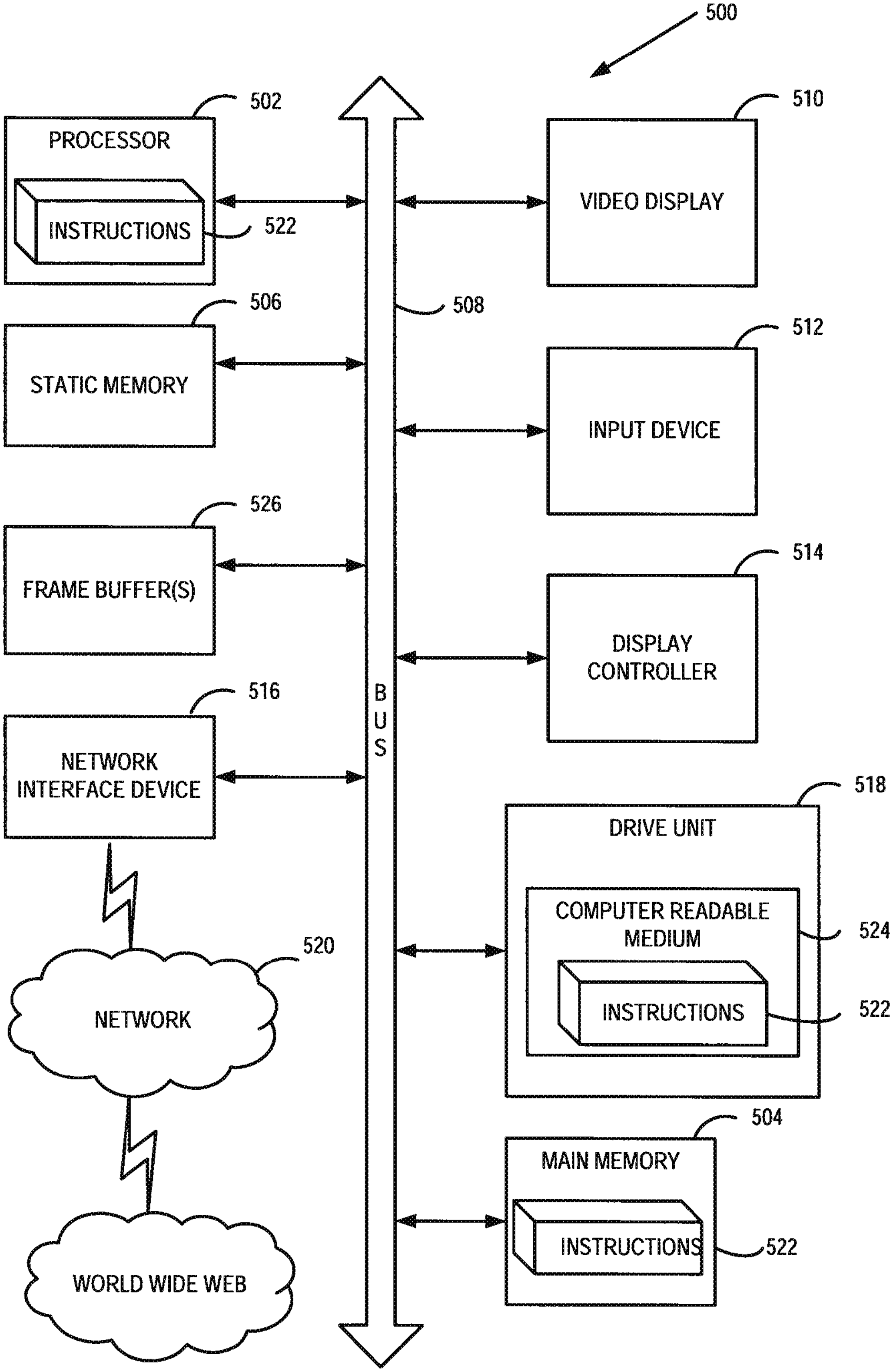
FIG. 5 is a block diagram illustrating a system according to various embodiments.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

According to various embodiments, FIG. 5 represents a form of the system shown in FIG. 1. In particular, it should be noted that the memory 130 (FIG. 1) may be in one or more of the memories shown in FIG. 5. The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 518 (e.g., a data storage device), which communicate with each other via a bus 508.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, a processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 522 for performing the operations and steps discussed herein.

The computer system 500 may further include a network interface device 516. The computer system 500 also may include a video display unit 510 (e.g., a liquid crystal display (LCD), light emitting diode (LED) display, a cathode ray tube (CRT)), and an input device 512 (e.g., a keyboard and/or mouse, etc.).

The secondary memory 518 may include a machine-readable storage medium (or more specifically a computer-readable storage medium) 524 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500, the main memory 504 and the processing device 502 also constituting machine-readable storage media. The software 522 may further be transmitted or received over a network 520 via the network interface device 516.

In various embodiments, display controller 514 controls frame buffers 526 to provide display content (e.g., window surfaces) to video display 510.

While the machine-readable storage medium 524 is shown in an exemplary embodiment to be a single medium, the terms "machine-readable storage medium" or "computer-readable storage medium" should be taken to include a single medium or multiple media (e.g., a centralized or distributed database, and/or associated caches and servers) that store the one or more sets of instructions. The terms "machine-readable storage medium" or "computer-readable storage medium" shall also be taken to include any medium that is capable of storing or encoding a set of instructions for execution by the machine/computer and that cause the machine/computer to perform any one or more of the methodologies of the present invention. The terms "machine readable storage medium" or "computer-readable storage medium" shall accordingly be taken to include, but not be limited to, solid-state memories, and optical and magnetic media.

Elements of embodiments may also be provided as a machine-readable or computer-readable medium for storing the machine-executable instructions. The machine or computer-readable medium may include, but is not limited to, flash memory, optical disks, CD-ROMs, DVD ROMs, RAMs, EPROMs, EEPROMs, magnetic or optical cards, or other type of machine-readable media suitable for storing electronic instructions. For example, embodiments of the invention may be downloaded as a computer program which may be transferred from a memory on a remote computer (e.g., a server) to a memory on a requesting computer (e.g., a client).

Various components described herein may be a means for performing the functions described herein. Each component described herein includes software, hardware, or a combination of these. The operations and functions described herein can be implemented as software modules, hardware modules, special-purpose hardware (e.g., application specific hardware, application specific integrated circuits (ASICs), digital signal processors (DSPs), etc.), embedded controllers, hardwired circuitry, etc.

Aside from what is described herein, various modifications may be made to the disclosed embodiments and implementations of the invention without departing from their scope. Therefore, the illustrations and examples herein should be construed in an illustrative, and not a restrictive sense.

What is claimed is:

1. A method for a computer system having a system frame buffer and multiple surface buffers allocated in video memory, the method comprising:

automatically detecting that a window surface associated with a first application is an exclusive window surface for a display;

automatically transitioning to a full-screen mode in which a graphics processor flushes content to the display including changing from flushing the system frame buffer to flipping between flushing a front surface buffer and a back surface buffer associated with the first application, the transitioning to the full-screen mode in response to detecting the exclusive window surface;

automatically detecting that the window surface associated with the first application is not an exclusive window surface for the display; and automatically transitioning to a windowed mode in which the graphics processor flushes content to the display including changing from flipping between flushing the front and back surface buffers to flushing the system frame buffer, wherein transitioning to the windowed mode includes copying the system frame buffer to one of the front and back surface buffers depending on which of the front and back surface buffers is currently being flushed.

2. The method of claim 1, wherein flushing the system frame buffer in windowed mode further comprises:

loading content to the system frame buffer from front surface buffers of multiple applications;

compositing the content, and flushing the system frame buffer.

3. The method of claim 1, wherein automatically detecting that a window surface associated with the first application is the exclusive window surface for the display comprises:

detecting that the window surface is composed of a single visible rectangle; and detecting that the window surface size is equal to the size of the system frame buffer.

4. The method of claim 1, wherein automatically transitioning to the full-screen mode requires that a content bit-depth for the front surface buffer and the back surface buffer equal a bit-depth of content currently on display.

5. The method of claim 1, wherein automatically transitioning to the full-screen mode further comprises:

moving a pointer of a display controller from pointing at the system frame buffer to point to the front surface buffer of the first application.

6. The method of claim 1, wherein automatically detecting that the window surface associated with the first application is not the exclusive window surface for the display further comprises:

detecting that the window surface is composed of more than one visible rectangle; and detecting that the window surface size is less than the size of the system frame buffer.

7. A system, comprising:

a graphics processor;

a display;

a memory having a system frame buffer associated with a window server, a front surface buffer associated with a first application, and a back surface buffer associated with the first application;

a kernel driver to automatically detect that a window surface associated with a first application is an exclusive window surface for the display;

a display controller to transition from a windowed mode to a full-screen mode in which the graphics processor flushes content to the display including changing from flushing the system frame buffer to flipping between flushing the front surface buffer and the back surface buffer;

the kernel driver further to automatically detect that the window surface associated with the first application is not an exclusive window surface for the display;

the display controller further to transition from the full-screen mode to the windowed mode in which the graphics processor flushes content to the display including changing from flipping between flushing the front and back surface buffers to flushing the system frame buffer to the display, wherein the transitioning to the windowed mode includes copying the system frame buffer to one of the front and back surface buffers depending on which of the front and back surface buffers is currently being flushed.

8. The system of claim 7, further comprising:

the window server to load content to the system frame buffer from front surface buffers of multiple applications, composite the content, and flush the system frame buffer to the display.

9. The system of claim 7, where the kernel driver further comprises:

a rectangle module to detect the number of visible rectangles in a window surface and determine whether the number of visible rectangles in a window surface is greater than one; and window size module to detect the size of the window surface and determine whether the size of the window surface is less than the size of the system frame buffer.

10. The system of claim 7, wherein the kernel driver further comprises:

a bit-depth module to compare a bit-depth of content in the front surface buffer with a bit-depth of content currently on the display.

11. A non-transitory computer-readable storage medium having instructions stored thereon that, when executed, cause a computer to:

automatically detect that a window surface associated with a first application is an exclusive window surface for a display;

automatically transition to a full-screen mode in which a graphics processor flushes content to the display including changing, from flushing a system buffer to flipping between flushing a front surface buffer and a back surface buffer associated with the first application, the transitioning to the full-screen mode in response to detecting the exclusive window surface;

automatically detect that the window surface associated with the first application is not an exclusive window surface for the display; and automatically transition to a windowed mode in which the graphics processor flushes content to the display including changing from flipping between flushing the front and back surface buffers to flushing the system frame buffer, wherein transitioning to the windowed mode includes copying the system frame buffer to one of the front and back surface buffers depending on which of the front and back surface buffers is currently being flushed.

12. The non-transitory computer-readable storage medium of claim 11, wherein the instructions that cause the flushing comprise further instructions that cause the computer to:

load content to the system frame buffer from front surface buffers of multiple applications;

composite the content; and flush the system frame buffer.

13. The non-transitory computer-readable storage medium of claim 11, wherein the instructions that cause the automatic detecting that a window surface associated with the first application is the exclusive window surface for the display comprise further instructions that cause the computer to:

detect that the window surface is composed of a single visible rectangle; and detect that the window surface size is equal to the size of the system frame buffer.

14. The non-transitory computer-readable storage medium of claim 11, wherein automatically transitioning to the full-screen mode requires that a content bit-depth for the front surface buffer and the back surface buffer equal a bit-depth of content currently on display.

15. The non-transitory computer-readable storage medium of claim 11, wherein the instructions that cause the automatic transitioning to the full-screen mode comprise further instructions that cause the computer to:

move a pointer of a display controller from pointing at the system frame buffer to point to the front surface buffer of the first application.

16. The non-transitory computer-readable storage medium of claim 11, wherein the instructions that cause the automatically detecting that the window surface associated with the first application is not the exclusive window surface for the display comprise further instructions that cause the computer to:

detect that the window surface is composed of more than one visible rectangle; and detect that the window surface size is less than the size of the system frame buffer.

* * * * *